(12) United States Patent
Kothera et al.

(10) Patent No.: US 7,837,144 B2
(45) Date of Patent: Nov. 23, 2010

(54) FLUID-DRIVEN ARTIFICIAL MUSCLES AS MECHANISMS FOR CONTROLLED ACTUATION

(75) Inventors: Curt S. Kothera, Crofton, MD (US); Benjamin K. S. Woods, College Park, MD (US); Jayant Sirohi, Greenbelt, MD (US); Norman M. Wereley, Potomac, MD (US); Peter C. Chen, Clarksville, MD (US)

(73) Assignees: Techno-Sciences, Inc., Calverton, MD (US); University of Maryland, Riverdale, MD (US)

( * ) Notice: Subject to any disclaimer, the term of this patent is extended or adjusted under 35 U.S.C. 154(b) by 365 days.

(21) Appl. No.: 11/502,360

(22) Filed: Aug. 11, 2006

(65) Prior Publication Data

US 2008/0035798 A1 Feb. 14, 2008

(51) Int. Cl.
*B64C 3/38* (2006.01)
*B64C 5/10* (2006.01)
*B64C 9/00* (2006.01)
*B64C 13/00* (2006.01)

(52) U.S. Cl. .................. 244/99.2; 244/99.3; 244/99.5; 92/90; 92/92

(58) Field of Classification Search ......... 244/210–217, 244/99.2, 99.3, 99.5; 92/90, 92
See application file for complete search history.

(56) References Cited

U.S. PATENT DOCUMENTS

| | | | |
|---|---|---|---|
| 2,415,128 A * | 2/1947 | Eaton .......................... 244/226 |
| 2,483,088 A * | 9/1949 | De Haven .................. 254/93 R |
| 2,844,126 A * | 7/1958 | Gaylord .......................... 92/90 |
| 3,082,142 A | 3/1963 | Payne et al. |
| 3,987,983 A * | 10/1976 | Cole .......................... 244/216 |
| 4,615,260 A | 10/1986 | Takagi et al. |
| 4,733,603 A * | 3/1988 | Kukolj .......................... 92/92 |
| 4,939,982 A | 7/1990 | Immega et al. |
| 5,067,390 A * | 11/1991 | Negishi .......................... 92/48 |
| 5,158,005 A * | 10/1992 | Negishi et al. .................. 92/92 |
| 5,201,262 A * | 4/1993 | Negishi et al. .................. 92/92 |
| 5,538,202 A * | 7/1996 | Thornburg .................. 244/215 |
| 5,651,513 A * | 7/1997 | Arena ........................ 244/99.3 |
| 5,887,828 A * | 3/1999 | Appa .......................... 244/215 |
| 6,349,746 B1 | 2/2002 | Bergemann et al. |

(Continued)

OTHER PUBLICATIONS

Prall, D., et al., "Properties of a Chiral Honeycomb with a Poisson's Ratio of -1", *International Journal of Mechanical Science*, vol. 39, No. 3, 1997, pp. 305-314.

(Continued)

*Primary Examiner*—Tien Dinh
*Assistant Examiner*—Philip J Bonzell
(74) *Attorney, Agent, or Firm*—Ober/Kaler; Royal W. Craig

(57) ABSTRACT

A fluid contact surface actuation system for a vehicle, including a first fluid contact surface constructed and arranged to act against a first fluid passing over the first fluid contact surface; and a first fluid actuator coupled to the first fluid contact surface to move the first fluid contact surface between a first position and a second position to enable control of the vehicle in a predetermined manner, the first fluid actuator having a first resilient bladder that receives a second fluid such that pressure of the second fluid moves the first bladder between a contracted configuration and an expanded configuration.

16 Claims, 17 Drawing Sheets

U.S. PATENT DOCUMENTS

| | | | |
|---|---|---|---|
| 6,800,351 B1 | 10/2004 | Pflug et al. | 428/73 |
| 6,908,028 B2 | 6/2005 | Utsumi et al. | 228/258 |

OTHER PUBLICATIONS

Warren, Thomas L., "Negative Poisson's Ratio in a Transversely Isotropic Foam Structure", *Journal of Applied Physics*, vol. 67, No. 12, Jun. 15, 1990, pp. 7591-7594.

Evans, K. E., "Tensile Network Microstructures Exhibiting Negative Poisson's Ratios", *Journal of Physics D: Applied Physics*, vol. 22, 1989, pp. 1870-1876.

Lakes, Roderic, "Foam Structures with a Negative Poisson's Ratio", *Science*, vol. 235, Feb. 27, 1987, pp. 1038-1040.

Choi, J. B., et al., "Non-Linear Properties of Polymer Cellular Materials with a Negative Poisson's Ratio", *Journal of Materials Science*, vol. 27, No. 17, Sep. 1992, pp. 4678-4684, 1 page containing Abstract only.

Choi, J. B., et al., "Non-Linear Properties of Metallic Cellular Materials with a Negative Poisson's Ratio", *Journal of Materials Science*, vol. 27, No. 19, Oct. 1992, pp. 5375-5381, 1 page containing Abstract only.

Friis, E. A., et al., "Negative Poisson's Ration Polymeric and Metallic Foams", *Journal of Materials Science*, vol. 23, No. 12, Dec. 1988, pp. 4406-4414, 1 page containing Abstract only.

Milton, Graeme W., "Composite Materials with Poisson's Ratios Close to -1", *Journal of the Mechanics and Physics of Solids*, vol. 40, Issue 5, Jul. 1992, pp. 1105-1137, 1 page containing Abstract only.

Frank Daerden, et al., "Pneumatic Artificial Muscles: actuators for robotics and automation", European Journal of Mechanical and Environmental Engineering, 2002, vol. 47, pp. 10-21.

Wenqing Zhang, et al., "Analysis of geometrically nonlinear anisotropic membranes: application to pneumatic muscle actuators", Finite Elements in Analysis and Design 41, 2005, pp. 944-962.

Robb W. Colbrunn, et al., "Design and Control of a Robotic Leg with Braided Pneumatic Actuators", Proceedings of the IEEE International Conference on Intelligent Robots and Systems, 2001, vol. 4, pp. 1964-1970.

T. Kerscher, et al., "Joint Control of the Six-Legged Robot AirBug Driven by Fluidic Muscles", Proceedings of the 3$^{rd}$ IEEE International Workshop on Robot Motion and Control, 2002, pp. 27-32.

B. Tondu, et al., "A Seven-degrees-of-freedom Robot-arm Driven by Pneumatic Artificial Muscles for Humanoid Robots", The International Journal of Robotics Research, vol. 24, No. 4, Apr. 2005, pp. 257-274.

Gregory S. Sawicki, et al., "Powered Lower Limb Orthoses: Applications in Motor Adaptation and Rehabilitation", Proceedings of the 2005 IEEE 9$^{th}$ International Conference on Rehabilitation Robotics, Jun. 28-Jul. 1, 2005, pp. 206-211.

\* cited by examiner

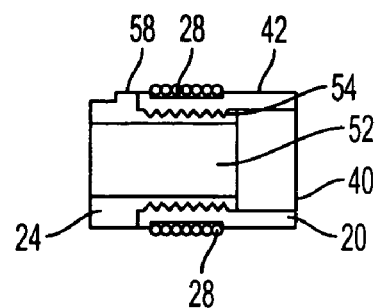
FIG. 5
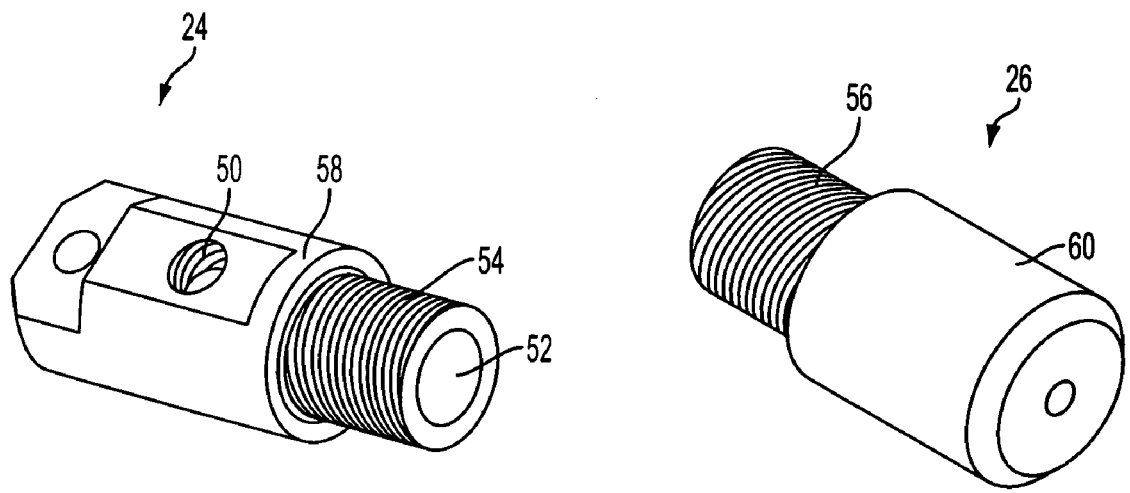
FIG. 6A
FIG. 6B

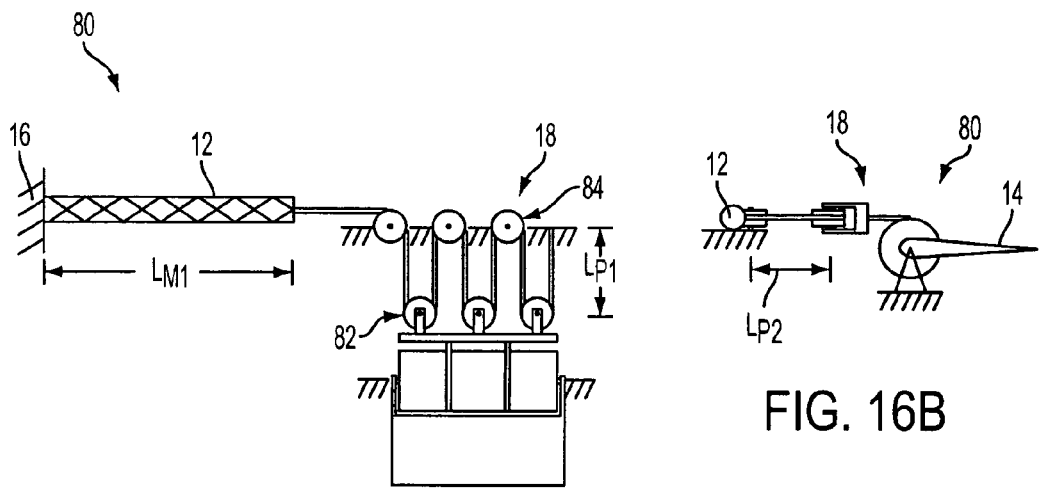
FIG. 16A
FIG. 16B
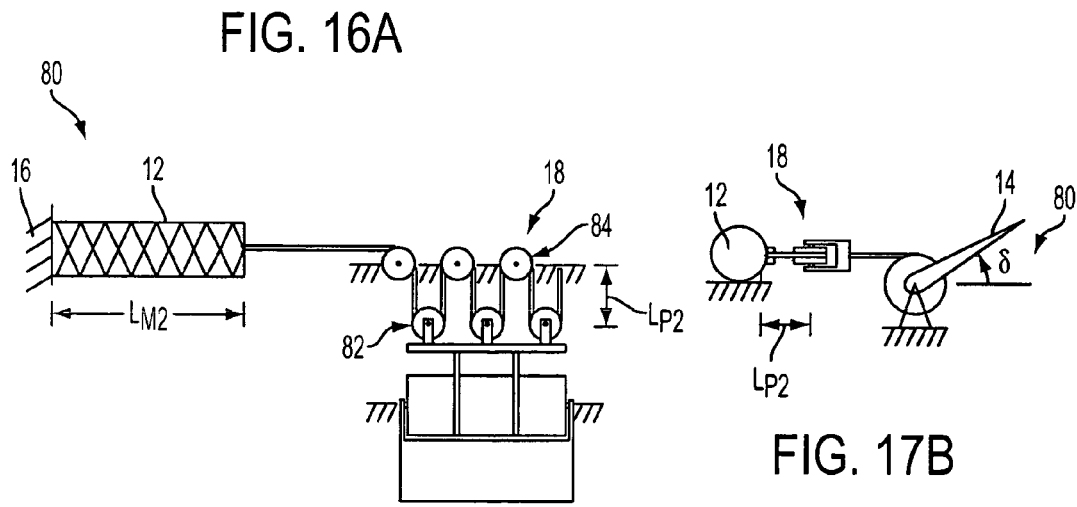
FIG. 17A
FIG. 17B

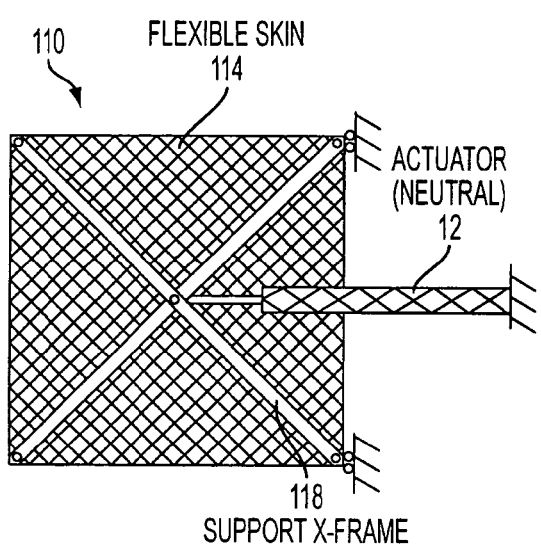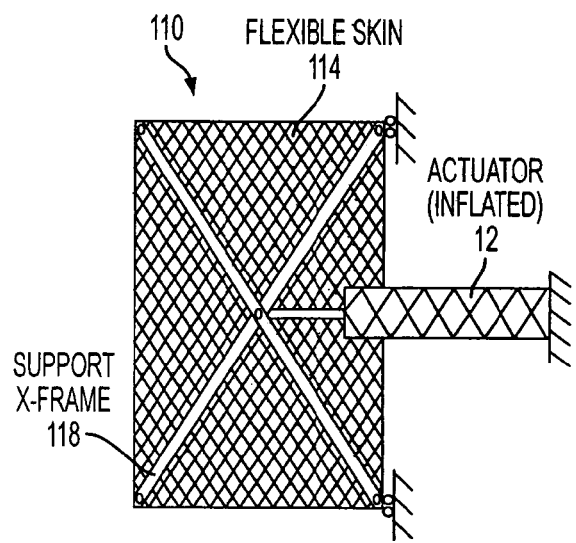
FIG. 20
FIG. 21

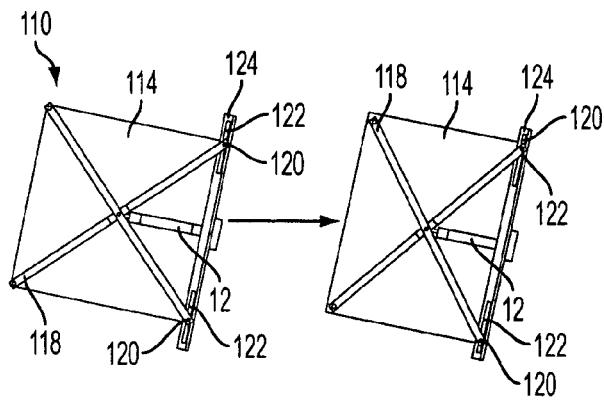 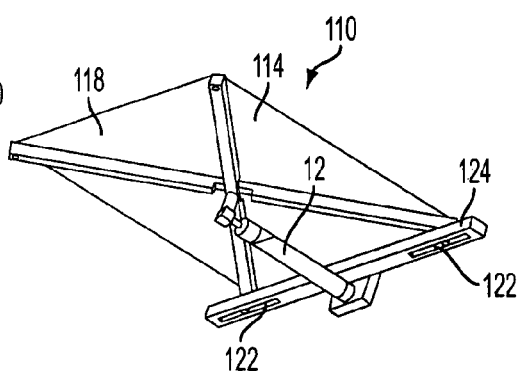
FIG. 22    FIG. 23
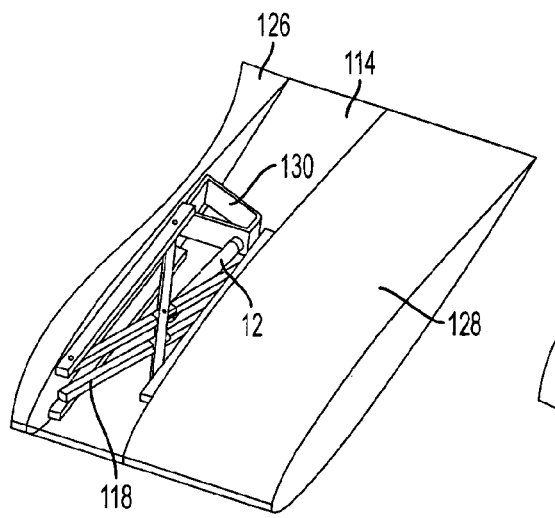 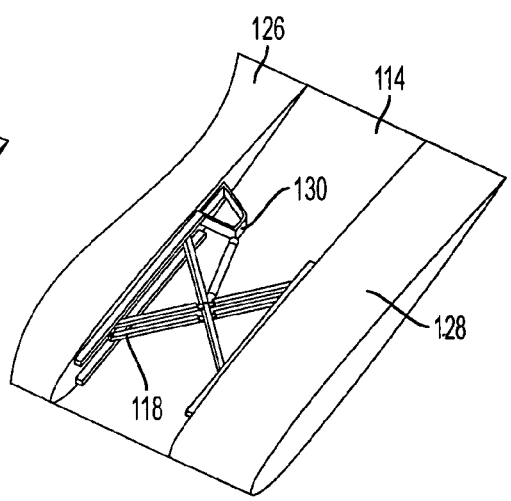
FIG. 24    FIG. 25

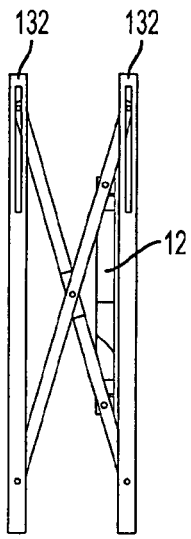
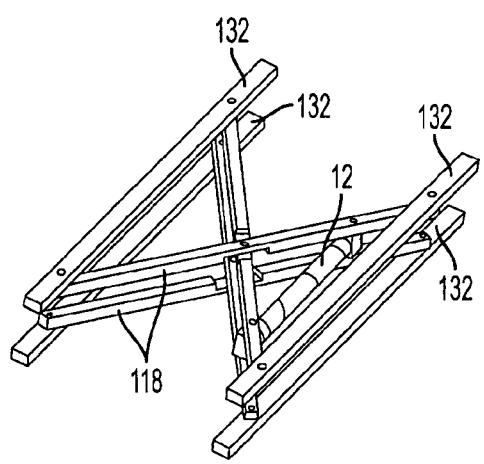
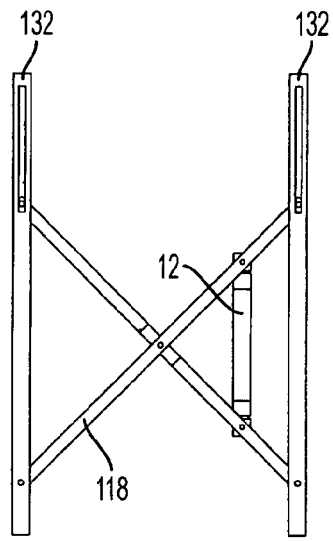
FIG. 26     FIG. 27     FIG. 28
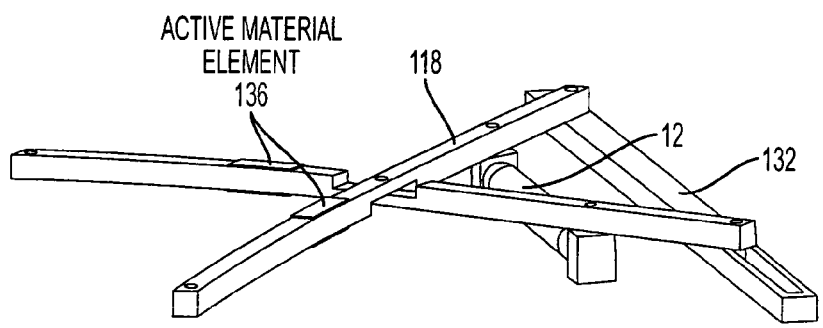
FIG. 29
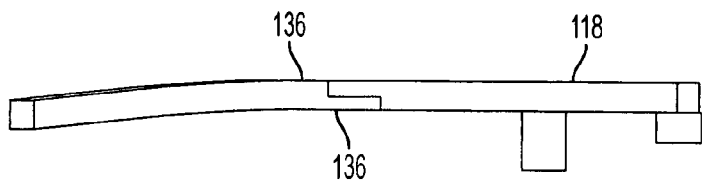
FIG. 30

FLUID-DRIVEN ARTIFICIAL MUSCLES AS MECHANISMS FOR CONTROLLED ACTUATION

BACKGROUND OF THE INVENTION

1. Field of the Invention

The present invention relates to the manipulation of fluid-driven artificial muscles for controlled actuation of elements. More specifically, the invention relates to apparatus and methods employing an artificial muscle to articulate the effective control of elements such as, for example, a fluid control surface of a vehicle.

2. Description of the Problem and Prior Art

Since the advent of vehicle flight, methods to obtain improved aerodynamic performance have been under consideration. The ability to maneuver a fixed wing aircraft is limited by factors related to airfoil design, weight, and flight conditions. However, vehicle performance and adaptability can be considerably increased through the implementation of control surface actuation. An actuation system appropriately placed can command authority over a vehicle's roll, pitch, or yaw. This capability in aircraft is one of the primary means of expanding the flight envelope, while maintaining vehicle stability and control.

Historically, control surfaces have primarily consisted of trailing edge flaps (ailerons), elevators, and rudders, where the ailerons control the rolling moment, the elevators control the pitching moment, and the rudder has control over the yaw moment. These control surfaces are typically actuated by hydraulic fluid systems or electric motors. Operating under high pressure, hydraulic systems are capable of producing large, sustainable control forces, but one noted disadvantage is the increase in weight resulting from the bulky actuator components, associated fluid, and piping. Electric motors are also capable of generating large control forces at high rates, but limitations are introduced by their size, power, and weight. Actuation methods that employ active material systems have proven to be limited in output performance for full-scale vehicles, even in the presence of mechanisms designed for mechanical advantage. The prior art actuation systems were all designed to accomplish essentially the same task. That is, to improve the aerodynamic performance of the host vehicle.

SUMMARY OF THE INVENTION

One aspect of the invention includes a fluid contact surface actuation system for a vehicle, comprising a first fluid contact surface constructed and arranged to act against a first fluid passing over the first fluid contact surface; and a first fluid actuator coupled to the first fluid contact surface to move the first fluid contact surface between a first position and a second position to enable control of the vehicle in a predetermined manner, the first fluid actuator having a first resilient bladder that receives a second fluid such that pressure of the second fluid moves the first bladder between a contracted configuration and an expanded configuration.

Another aspect of the invention includes a vehicle, comprising a main body portion; a first fluid contact surface coupled to the main body portion and constructed and arranged to act against a first fluid passing over the first fluid contact surface; and a first fluid actuator coupled to the first fluid contact surface to move the first fluid contact surface between a first position and a second position to control the vehicle in a predetermined manner, the first fluid actuator having a first resilient bladder that receives a second fluid such that pressure of the second fluid moves the first bladder between a contracted configuration and an expanded configuration.

Another aspect of the invention includes a method of controlling a vehicle, comprising actuating a first fluid actuator coupled to a first fluid contact surface to move the first fluid contact surface between a first position and a second position as a first fluid passes over the first fluid contact surface in order to control the vehicle in a predetermined manner, the fluid actuator having a first resilient bladder and the actuating of the first fluid actuator including pressurizing a second fluid in the first bladder to move the first bladder between a contracted configuration and an expanded configuration.

Another aspect of the invention includes a fluid driven device for applying a force, comprising a resilient bladder coupled to a braiding, the bladder having a first end and a second end, the first end having an opening that permits access to a cavity positioned within the bladder between the first and second ends; a first fitting attached to and inserted into the first end of the bladder, the first fitting having a threaded portion to threadedly engage the first end of the bladder, the first fitting having an aperture extending completely the first fitting to provide a fluid passageway through the first fitting and into the cavity; and a second fitting coupled to the second end of the bladder.

It is an object of the invention to provide a highly adaptable, compliant, and lightweight actuation technology for aerodynamic control surface manipulation, which can easily interchange between large force and large stroke operation. The aim of the invention is thus to perform the aforementioned performance improving functions for a wide range of air and sea vehicles.

Additional effects, features and advantages appear in the detailed description that follows.

BRIEF DESCRIPTION OF THE DRAWINGS

The accompanying drawings facilitate an understanding of the various embodiments of this invention. In such drawings:

FIG. 5 is an exploded view of the FAM of FIG. 4;

FIGS. 6a and 6b show the end fittings of the FAM of FIG. 3;

FIGS. 16A and 17A show the front views and FIGS. 16B and 17B show the side views illustrating the movement of another embodiment of a device in accordance with the present invention;

FIGS. 20-30 show embodiments of the FAM of FIG. 1 employed with a frame of a fluidfoil;

DETAILED DESCRIPTION OF THE ILLUSTRATED EMBODIMENTS

Figure 1:
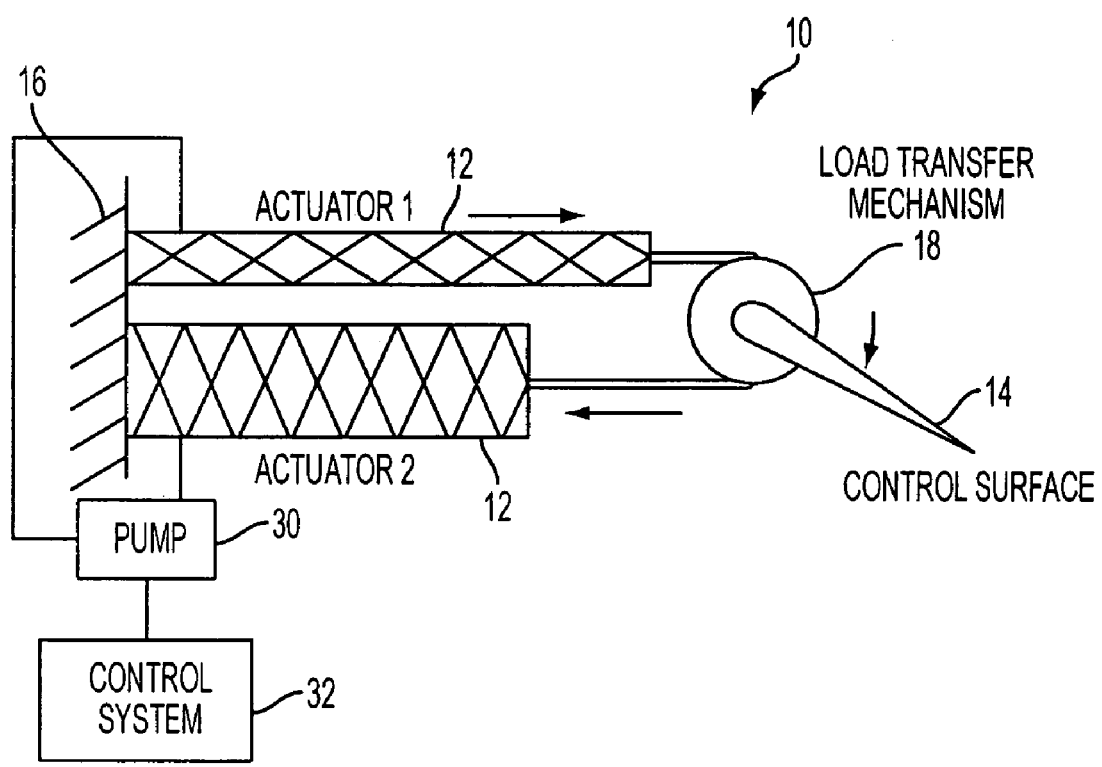
FIG. 1 shows a device in accordance with a first embodiment of the present invention.

The actuation system 10 of the present invention utilizes one or more fluid-driven artificial muscles ("FAMs") 12 to manipulate fluid control surfaces 14 for improved characteristics and stability of a vehicle 16 moving through the fluid. When a vehicle 16 requires performance characteristics that are outside its standard limits of design, the fluid control surfaces 14 may be incorporated to extend the operational envelope of the vehicle 16.

The system 10 of the invention has a high degree of adaptability. This is due, in part, to the inherent flexibility of the FAM 12. A FAM 12 is typically composed of an elastomeric bladder 20 surrounded by braided mesh 22 with a first end fitting 24, which is open for pressurized fluid exchange, and a closed end fitting 26. By varying the internal pressure within the FAM 12, the FAM 12 expands radially while contracting axially. This enables the FAM 12 to serve as a dual-role actuator, switching between a high-force, low-stroke device and a low-force, high-stroke device that may be arranged to pull linearly (such as piston motion) or pull in a conformal contour (such as smooth morphing or shape change). These properties, along with the easily interchangeable actuator components (such as bladder material and size, braid, etc.) and working fluid (such as air, oil, etc.), may be designed to match the impedance of the control surface 14 structure to optimize performance and efficiency.

The FAM 12 provides high performance capabilities since the FAM 12 may achieve both high-force and high-stroke operation, and this, coupled with the customizable materials and system parameters, offers the ability to design an extremely lightweight system. Thus, the actuation system 10 is one with high power density, or a high power-to-weight ratio, which makes it ideal for vehicle applications where system weight is critical.

System 10 also provides the ability to manage or control vibration that may detrimental to mechanical components of the vehicle 16. For example, the system 10 may be employed to decrease vibration, maintain vibration, or increase vibration, as desired. This feature is based on the ability to tailor parameters of system 10 as desired and may depend upon the design of the transfer mechanism 18 (such as a pulley, lever, gear, hinge, etc.), which links the actuator or FAM 12 to the control surface 14. The bandwidth of the system 10 may be tuned during manufacture by material selection (such as size, thickness, hysteresis, etc.) and by the particular transfer mechanism 18 employed to both increase the fatigue life of the actuation system 10 and the structural components of the host vehicle 16.

The actuation system 10 may be utilized, for example, for directional control and/or vibration control. When used for vibration control, the system 10 reduces the mechanical loading experienced by the structure of the vehicle 16 for an extended fatigue life, while also enhancing occupant comfort.

FIG. 1 illustrates one general configuration of a system 10 wherein the actuators or FAMs 12 are employed for control of a fluid control surface 14 in the form of a flap mechanism. Although as set forth below, the system 10 may include one or more FAMs 12, the system 10 illustrated in FIG. 1 includes two FAMs 12, in addition to a load transfer mechanism 18 in the form of a pulley, and a control surface 14 in the form of a flap. This system 10 is also equipped with a fluid pumping system 30 (including such things as valves, fluid lines, a pressure source, etc.) to regulate the internal fluid pressure of the actuators and a control system 32 to update the surface 14 deflection based upon feedback from sensors (such as, angle sensors, displacement sensors, accelerometers, etc.).

Figure 2A:
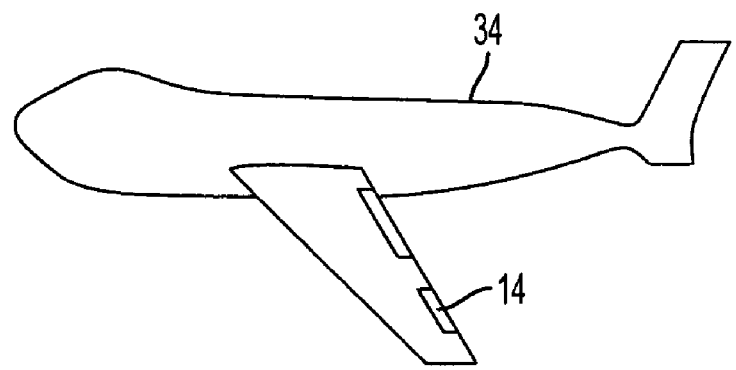
FIG. 2 shows examples of vehicles on which the device of FIG. 1 may be utilized.
Figure 2B:
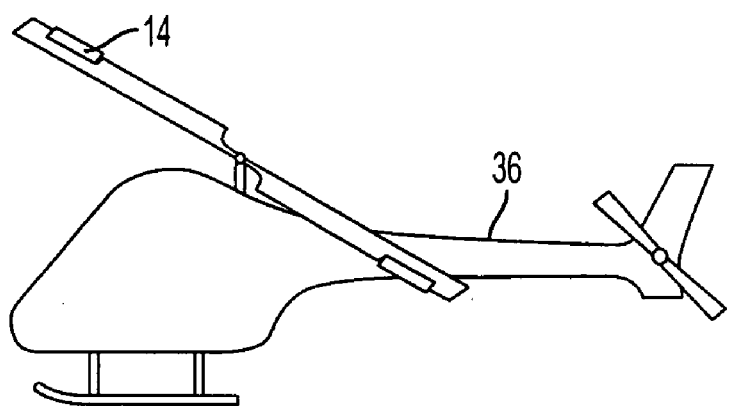
Figure 2C:
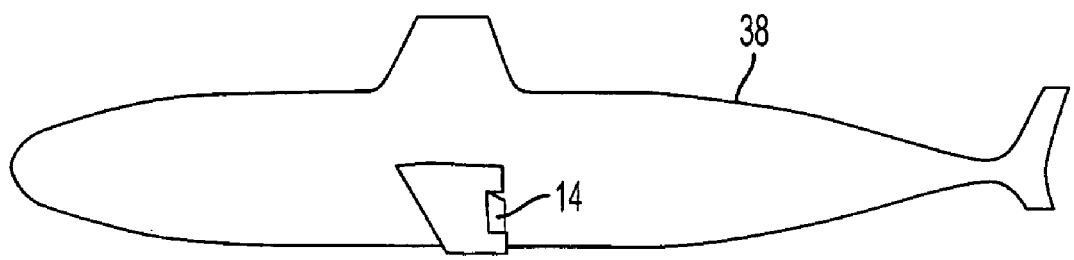
Figure 3:
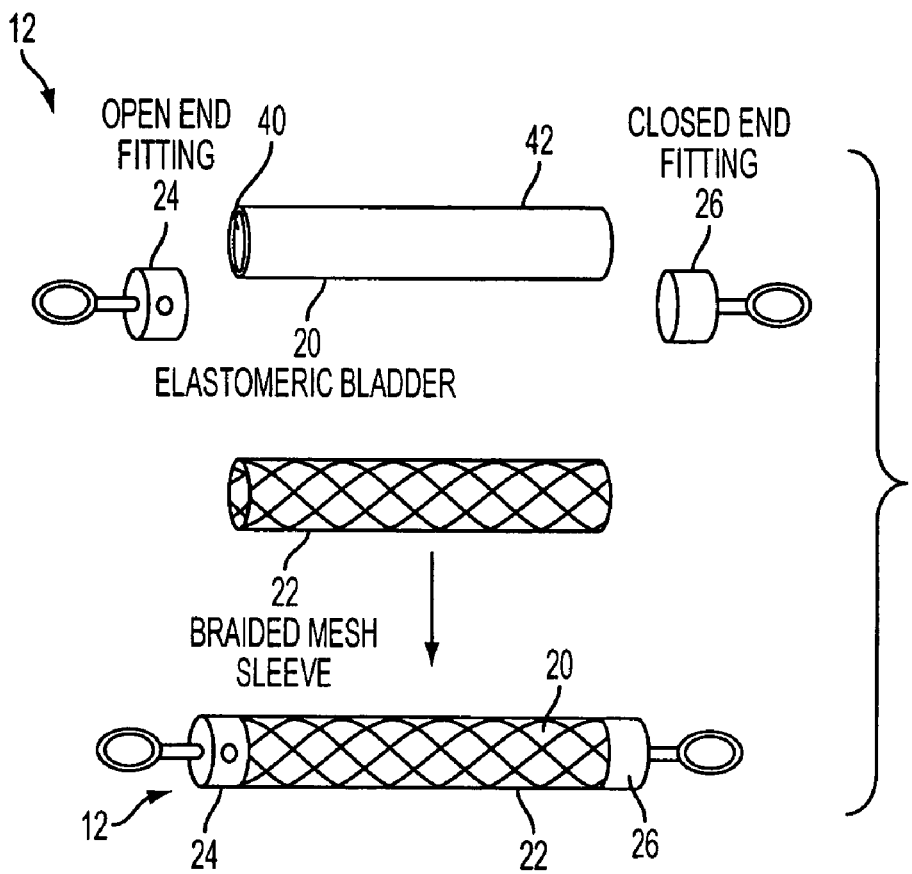
FIG. 3 shows an exploded view of the fluid actuated muscle ("FAM") of FIG. 1.
Figure 4:
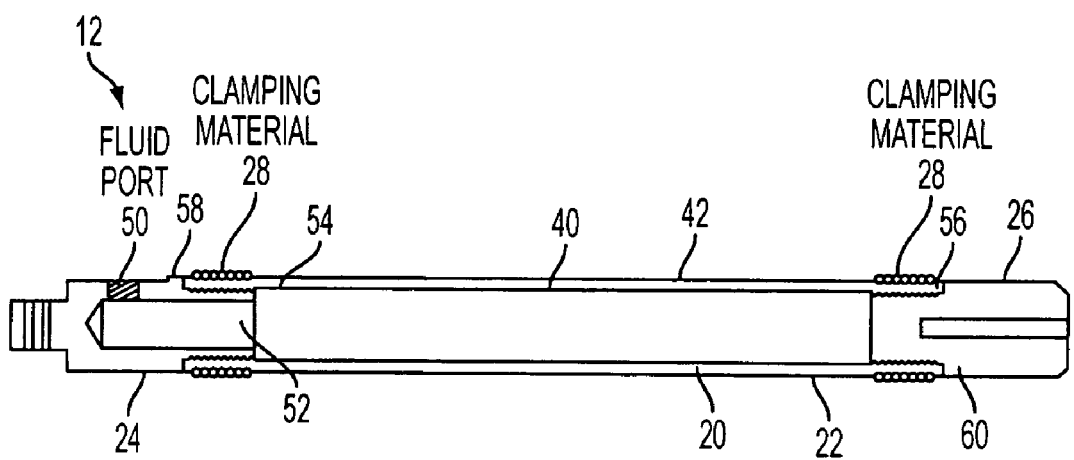
FIG. 4 is a cross-section of the FAM of FIG. 3.

The system 10 of the invention may be employed in any type of desired location and on any vehicles, including aircraft, such as, full-scale and unmanned aerial vehicle scale (UAV-scale) vehicles and including fixed-wing and rotorcraft, and watercraft, such as, full-scale and unmanned underwater vehicle scale (UUV-scale) vehicles, and including underwater and above surface vehicles. FIG. 2 illustrates three example of vehicles on which system 10 may be employed, namely, an airplane 34, a helicopter 36, and a submarine 38. Additionally, the system 10 of the invention may be employed in other technology in addition to vehicles. For example, the system 10 may be employed in controllable munitions, such as, gun-fired, missiles, torpedoes, etc.

The actuator or FAM 12 is illustrated in more detail in FIGS. 3-6B. Although the figures show one embodiment of a FAM 12, it should be understood that other types of actuators may be employed. The FAM 12 is generally an actuator in the form of a fluid-driven artificial muscle or FAM, which may used, for example, for bi-directional control of a fluid control surface 14 (in an antagonistic arrangement) or for unidirectional control of the fluid control surface 14. During operation, the FAM actuators 12 may be controlled manually or automatically to articulate control surface 14 deflections statically or dynamically for increased maneuverability and stability of the vehicle 16.

A broad array of artificial muscle actuators 12 have been developed, from both active and passive material components, but those to be employed in the present invention are preferably of the passive type. Even more specifically, these artificial muscles may be driven by a pressurized fluid; such as, a pressurized gas or a pressurized liquid. Hence, they are collectively referred to as fluid-driven artificial muscles (FAMs). Various types of other fluid-driven actuators are disclosed in the prior art, such as in U.S. Pat. No. 2,483,088 to De Haven; U.S. Pat. No. 2,844,126 to Gaylord; ; U.S. Pat. No. 4,615,260 to Takagi et al.; U.S. Pat. No. 4,939,982 to Immega et al.; ; U.S. Pat. No. 6,349,746 to Bergemann et al., each of which is incorporated herein in its entirety by reference thereto, respectively.

The actuator 12 changes in length in response to pressure variation, beginning with the maximum length under no applied pressure and contracting with increasing pressure until some geometrical limit of the braid angle of the braiding 22 is reached. The fundamental components for this type of artificial muscle, as shown in FIGS. 3-6B, include a resilient bladder or tube 20, a braiding 22, and two end fittings 24 and 26.

The bladder 20 may be formed of any appropriate resilient material, including elastomeric material and may be formed in the shape of a tube with a hollow chamber 40. The braiding 22 may be of any appropriate configuration and material to provide a mechanism to prevent the bladder 20 from over expanding beyond desired limits. The bladder and braiding may be distinct components or the braiding may be embedded or co-cured with the resilient material, as in the braiding material being the reinforcement and the resilient material being the matrix of a composite material bladder. As illustrated, the braiding 22 may be a braided mesh sleeve that encloses the outer surface of the bladder 20. The braiding may take other forms, including being embedded into the bladder 20. The two end fittings are most clearly shown in FIGS. 4-6B. The first end fitting 24 includes a port 50 and an opening 52 so that a fluid passageway may be established between the source of pressurized fluid and the inner chamber 40 of bladder 20. Fitting 24 is illustrated with a threaded section 54 for creating a threaded connection with the bladder 20. The bladder 20 may have a corresponding threaded section or be unthreaded. If bladder 20 is unthreaded, the threaded section 54 may form threads or thread-like indentations in the inner surface of bladder 20 upon installation to create the desired connection between the bladder 20 and the fitting 24. The second end fitting 24 may have a similar threaded section 56 and may be closed to fluid passage, as illustrated. The fittings 24, 26 may be made of any appropriate material, such as an appropriate metal. Additionally, the fittings 24 and 26 may be configured such that the threaded sections 54 and 56 are recessed from outer surfaces 58 and 60, respectively, so that the outer surface 42 of the assembly of the bladder 20 and braiding 22 is flush with the outer surfaces 58 and 60 of the fittings 24 and 26 to form a more compact actuator 12. Once the bladder 20 is installed over the end fittings 24 and 26, an appropriate clamping material 28 may be employed over the bladder 20 to maintain the bladder's connection with the fittings 24 and 26 during pressurization of the bladder 20. In the figures, the clamping material 28 is formed of a wound material, such as metal, and is positioned directly over the threaded sections 54 and 56. Further, if necessary or desired, an adhesive may be applied between elements to further secure the connection. For example, an appropriate adhesive may be applied between the bladder 20 and the end fittings 24 and 26 and/or between the bladder 20 and mesh 22 and the clamping material 28 in order to further secure the connection between the elements.

Figure 7:
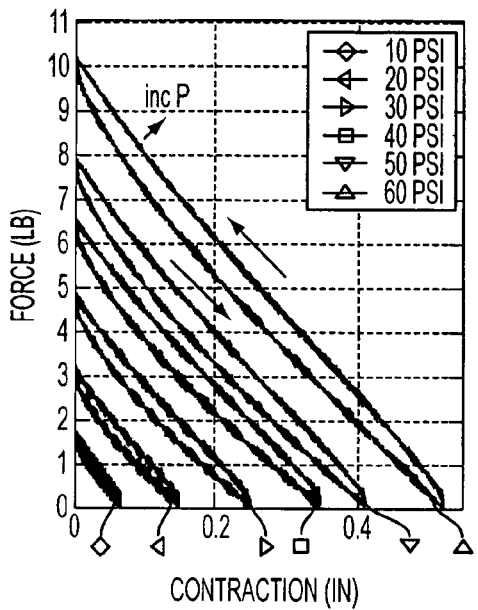
FIGS. 7-9 are graphs illustrating the performance of the FAM of FIG. 1.
Figure 8:
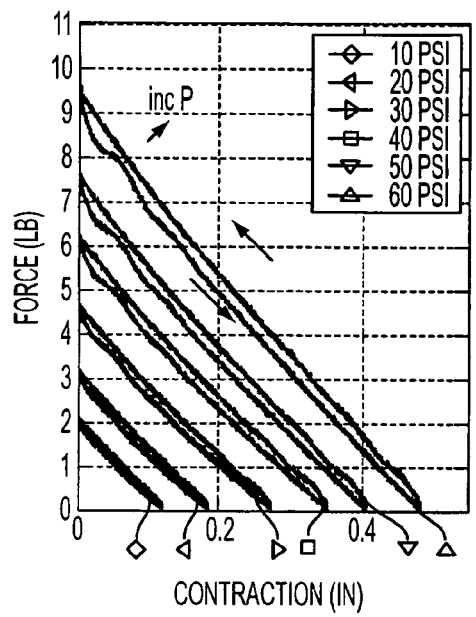
Figure 9:
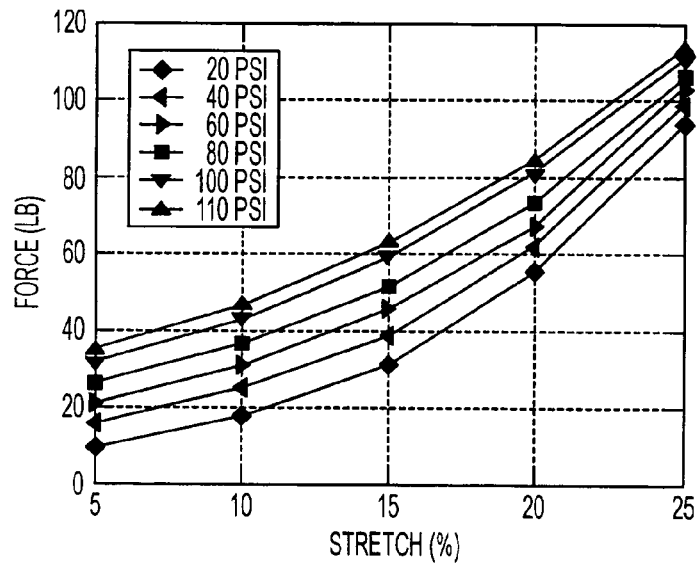

The maximum force generated with no contraction (blocked force) and maximum contracted length with no applied load (free contraction) are used to characterize the actuator 12. As mentioned above, any appropriate fluid may be used to pressurize the FAM 12, including liquids and gases. FIG. 7 shows representative force-contraction data as a function of applied pressure for a FAM 12 pressurized by air, also known as a pneumatic artificial muscle (PAM), and FIG. 8 shows the same for a hydraulic FAM 12, or hydraulic artificial muscle (HAM). In these figures, the effect of the fluid type on the response behavior is brought out, where it can be seen that the PAMs experience more hysteresis than the HAMs. This can be seen by comparing the area within the force-contraction loops for the test conditions displayed. Another factor that impacts the actuation response of the FAMs 12 is pre-stretch or stretching the FAM 12 prior to use. Though not needed for basic operation and depending on the fabrication technique, pre-stretch can be used to increase the stroke length of the actuators and the maximum force generation. Representative results of these effects on the blocked force of a PAM are provided in FIG. 9. This data establishes a nonlinear trend of increased blocked force with pre-stretch percentage.

Although various types of FAM 12 may be employed in the system 10, the FAM 12 illustrated and described herein provides a device that is lightweight and conformal compared to the heavy and rigid-link actuators previously known.

Control surface 14 may be any appropriate surface that, when moved, provides control of the vehicle 16. The control may be in various forms, such as directional control of the vehicle and/or vibrational control of the vehicle or parts of the vehicle. Control surface 14 may take various forms, including, for example, a flap, slat, aileron, elevator, rudder, wing, and/or fin, etc. The control surface 14 may constitute the entire element, such as an entire elevator or rudder, and it may constitute a portion of an element, such as an elevator, rudder, tab, or brake, depending on the desired application.

The transfer mechanism may be any appropriate transfer mechanism that provides the appropriate transfer of force from the FAM 12 to the fluid control surface 14. Although the transfer mechanism 18 is illustrated as a pulley, it may take various configurations, as desired. For example, the transfer mechanism 18 may include such elements as hinges or levers.

One aspect of the actuation system 10 is to provide a mechanism to articulate control surface 14 deformations on a vehicle 16 to improve the performance characteristics and stability. In one embodiment illustrated in FIG. 1, the system 10 includes two FAMs 12 that work opposite to each other to move the control surface 14 in opposite directions. FIG. 1 shows the FAM 12 Actuator 2 as being pressurized while FAM 12 Actuator 1 is not pressurized to a resistive degree. When pressurized, Actuator 2 expands radially and contracts axially to move the control surface 14 in the clockwise direction as seen in FIG. 1. Simultaneously, the pressure in Actuator 1 is released permitting Actuator 1 to expand axially and contract radially, thus, permitting the movement of the control surface 14.

Figure 10:
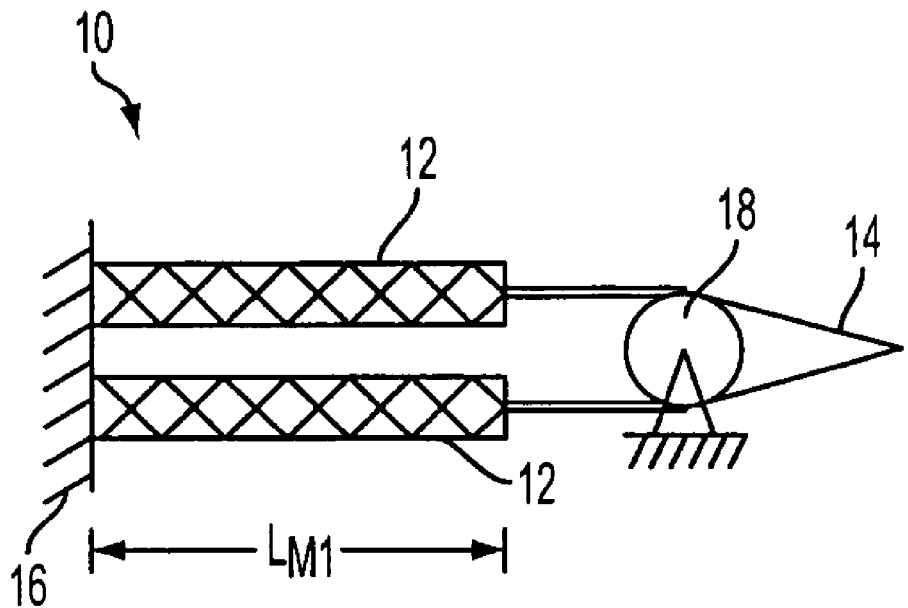
FIGS. 10-11 show the movement of the device of FIG. 1.
Figure 11:
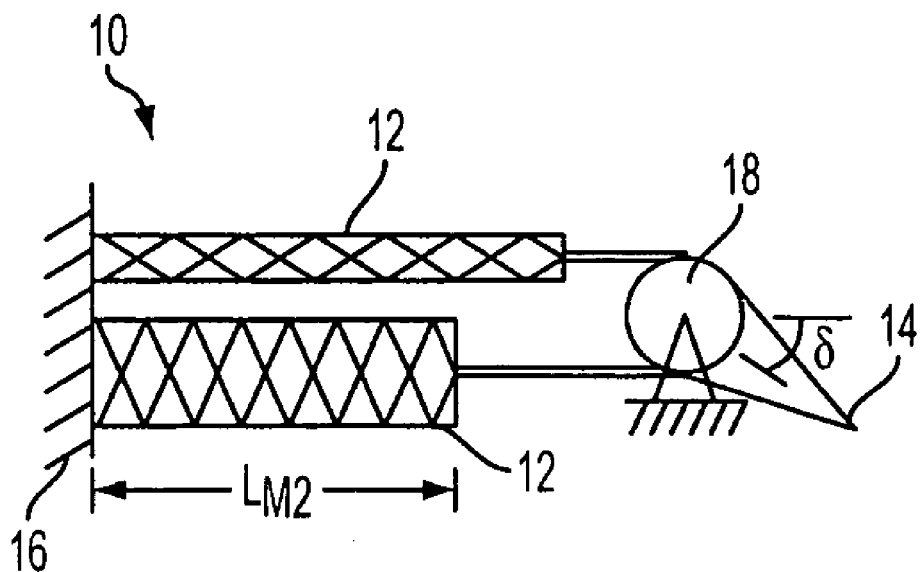

Two arrangements for implementation of FAM actuators 12 to deflect control surfaces 14 are chordwise and spanwise. In the case of chordwise orientation, as is depicted in FIGS. 1, 10 and 11, the control surface 14 may be directly linked to the actuators 12, though the transfer mechanism 18 with mechanical advantage may also be used. In the system 10 illustrated in FIGS. 10 and 11, the resting length $L_{M1}$ is shortened to $L_{M2}$ by the increase in pressure in the lower FAM, resulting in a control surface deflection of the angle δ. Although FIG. 10 labels the resting state as "unpressurized," a bias pressure can also be applied for added performance.

Figure 12:
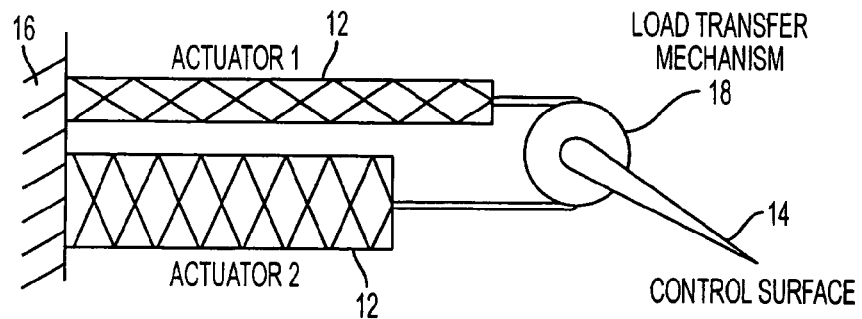
FIGS. 12-15 show various embodiments of the device of FIG. 1.
Figure 13:
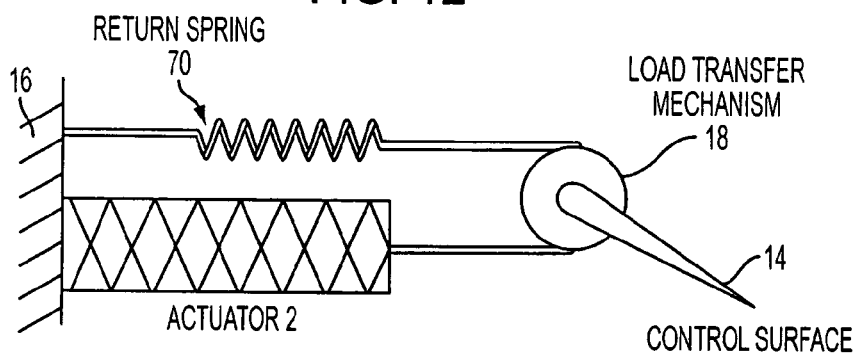
Figure 14:
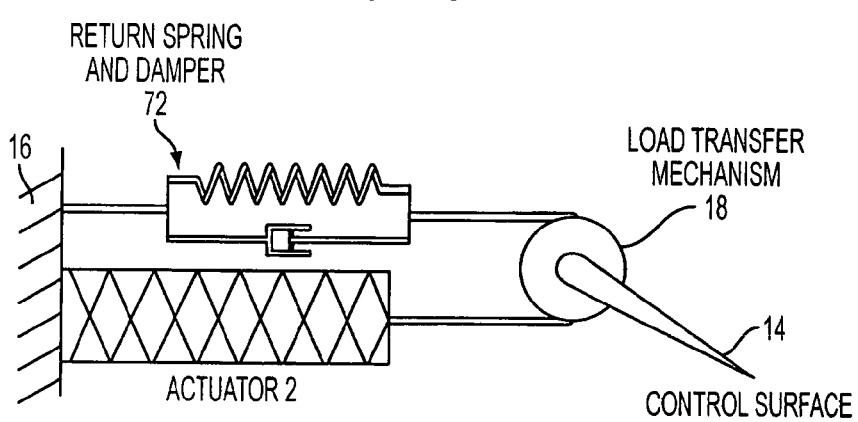
Figure 15:
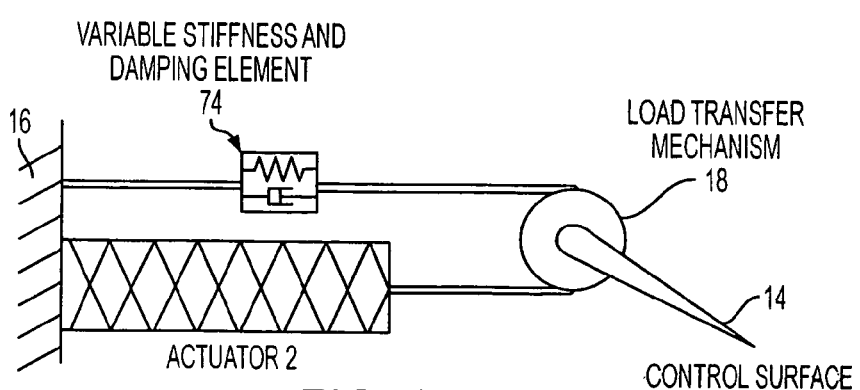

FIGS. 12-15 illustrate some of the various alternative configurations that may be employed to move a control surface 14 in a way similar to that shown in FIGS. 1, 10 and 11. For ease of understanding, FIG. 12 is substantially identical to FIG. 1 and FIGS. 13-15 are substantially identical to FIG. 12 but for replacing Actuator 1 with various other mechanisms. In FIG. 13, a return spring 70 is shown that may provide a substantially constant compression force, which may be overcome when Actuator 2 is sufficiently pressurized. In FIG. 14, a return spring and damper assembly 72 is shown that may provide a substantially constant compression force, which may be overcome when Actuator 2 is sufficiently pressurized and additionally provide a predetermined level of damping when the Actuator 2 is depressurized to damp the movement of the control surface 14. In FIG. 15, a variable stiffness element and damper element assembly 74 is shown that may provide a variable compression force, which may be overcome when Actuator 2 is sufficiently pressurized and additionally provide a predetermined level of damping when the Actuator 2 is depressurized to damp the movement of the control surface 14.

For spanwise orientation, the actuators will pull at a direction near 90 degrees with the chord. This implies that a load transfer mechanism is required for the spanwise orientation. FIGS. 16A to 17B show a representative spanwise FAM actuation system 80 with a pulley network as the load transfer mechanism 18. In this example configuration, as the actuator 12 contracts under pressure from $L_{M1}$ to $L_{M2}$, the non-fixed pulleys 82 move from a distance $L_{P1}$ with the fixed pulleys 84 to a distance of $L_{P2}$, which deflects the control surface 14 by δ degrees. It should be noted that the FIGS. 16A-17B show only one actuator 12 (unidirectional control), but a similar arrangement could be included for bidirectional capabilities similar to the manner shown with respect to FIG. 1.

For spanwise actuation in a rotorcraft, it may be advantageous to place the FAM actuators 12 near the hub of the rotor to avoid potentially adverse pressure effects on the fluid lines. In this case, the load transfer mechanism 18 would also be modified to include an additional mechanical component that links the actuators 12 to the 90 degree mechanism 18. Examples of transfer mechanisms 18 that may be employed include, but are not limited to, push (pull) rods, cables, and/or gear chains, etc. In the event that the actuation system 80 was designed to have a rigid member serve this role, the design could also include a stiffness and/or damping element (fixed or variable) to counteract the centrifugal force field acting on the system 80.

While the illustrated embodiments may focus on the example of aerodynamic structures or the like with the control surfaces 14 designed to counteract forces in the direction of vehicle 16 motion, the actuation system of the invention applies to other types of structures as well. For instance, if a control surface 14 was located at the tip of a wing with the hinge 18 running along the chord (perpendicular to those previously mentioned), spanwise actuators could be directly connected, whereas chordwise actuators would require a load transfer of 90 degrees.

Figure 18:
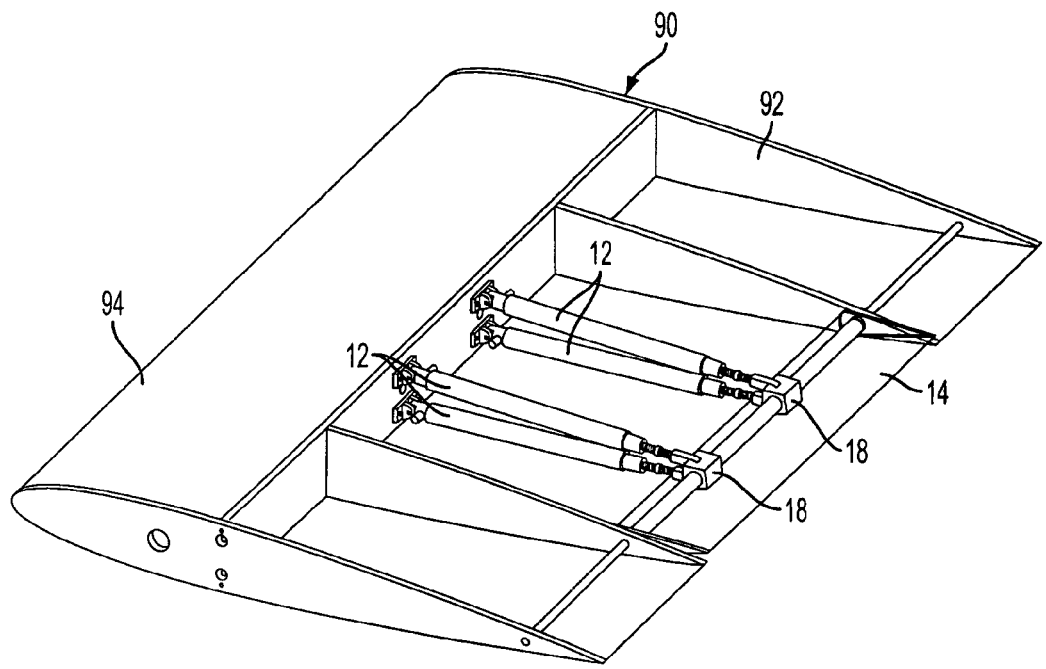
FIGS. 18-19 show embodiments of the device of FIG. 1 installed in a fluidfoil.
Figure 19:
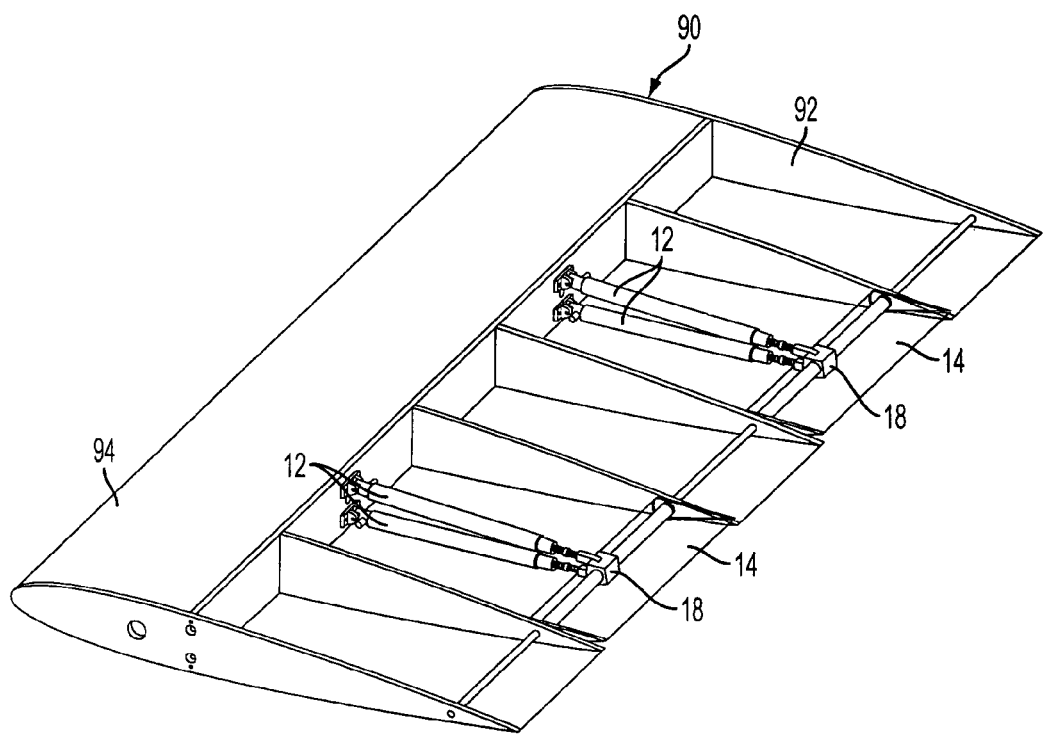

FIGS. 18 and 19 illustrate two embodiments of the system 10 employed within a fluidfoil 90, such as an aerofoil or a hydrofoil. In the figures, the FAMs 12 are positioned within the main portion 92 of the fluidfoil 90 and rigidly attached to a spar 94 at one end while being attached via a pulley mechanism 18, which is rigidly attached to the fluid control surface 14 in the form of a control flap. FIG. 18 shows a four FAM 12 arrangement wherein two FAMs 12 are employed for moving the flap 14 in each direction, and FIG. 19 shows two sets of spaced two FAM 12 arrangements, which are similar to that shown in FIG. 1.

Another configuration relates to shape morphing vehicles. A morphing vehicle is one in which the aerodynamic or hydrodynamic surfaces smoothly deform, or morph, into different conformal shapes to alter its respective performance. The smooth contours replace the abrupt angle changes that are seen with the aforementioned control surfaces 14 (such as flaps, ailerons, rudders, etc.) for improved performance. In this case, the FAM actuators 12 drive conformal shape changes in the aerodynamic or hydrodynamic surfaces, such as wings or fins, for example. A representative morphing system 110 is illustrated in FIGS. 20 and 21, which illustrate a FAM 12, a transfer mechanism 118, in the form of a supporting X-frame, and a fluid control surface 114, in the form of a flexible skin. The actuator 12, transfer mechanism 118 and flexible skin 114 (shown checkered) are in the neutral resting state in FIG. 20, and then when the FAM actuator 12 is inflated with pressurized fluid, as in FIG. 21, the supporting X-frame 118 transfers the energy to the skin 114, which consequently stretches in the vertical direction while contracting in the horizontal direction. In the arrangement shown, the contraction of the actuator 12 can result in relatively large planform area changes. In a wing, for example, individual morphing cells could be strategically placed to achieve the desired flight characteristics, or the entire wing could be implemented with this technology to achieve much larger shape changing capability. FIGS. 22 and 23 further illustrate the morphing shown in FIGS. 20 and 21, while showing the X-frame 118 as including sliders 120, which slide within slots 122 in a fixed member 124, to which the FAM 12 is attached as well. Further, FIGS. 24 and 25 show the morphing system 110 employed in a wing 126 having a tip 128 that moved more outboard or more inboard depending on the movement of the X-frame 118. The movement of the X-frame 118 and the skin 114 in FIGS. 24 and 25 is substantially identical to that shown in FIGS. 20-23 but for the location of the FAM 12 being shifted so as to be mounted on a fixed extension 130 within the wing 126.

Though FIGS. 20-25 display unidirectional morphing actuation, bi-directional actuation could be similarly achieved with an opposite, antagonistic FAM actuator 12, or with an energy storage device, such as a composite skin 114 with specially designed stiffness or counter balance such as a spring, which could return the aerodynamic or hydrodynamic surface 114 to its original state when one actuator 12 is de-activated, as described above. One alternative embodiment to achieve bi-directional planform changes, for example, may include attaching one FAM actuator 12 horizontally between the upper (lower, or both) frame members of the X-frame 118 with another FAM 12 attached vertically between the frame members of the X-frame 118 on the left (right, or both). FIGS. 26-28 illustrate another configuration of the system 110 for employing in a situation as shown in FIGS. 24 and 25. That is, FIGS. 26-28 show an X-frame 118, wherein the actuator 12 is positioned between members of the X-frame 118, and the members are slidably affixed to fixed members 132 having slots 134 for receiving the slider ends of the X-frame 118.

Taking the morphing concept one step further, in another embodiment illustrated in FIGS. 29 and 30, the members of the supporting X-frame 118 of FIGS. 26-28 may be made active to achieve out-of-plane morphing deformations as well. In this instance, as seen in FIGS. 29 and 30, the stiffness of the supporting X-frame members is tailored with the force generation of active materials 136, such as, piezoelectric patches, macro-fiber composite patches, poly-vinylidene fluoride actuators, etc., to essentially create active beam elements that can bend the aerodynamic surface (flexible skin) or hydrodynamic surface up or down. Operated alone or together with the FAM actuators 12, complex shapes that may not be possible to replicate with conventional actuators (e.g., conformal camber, twist, etc.) could be fully realized or, at least, more easily realized. As noted previously, the morphing system 110 may be formed as individual morphing cells that may be concentrated at particular locations along the aerodynamic or hydrodynamic surface 14, 114 or the entire surfaces 14, 114 could be implemented with them.

Figure 31:
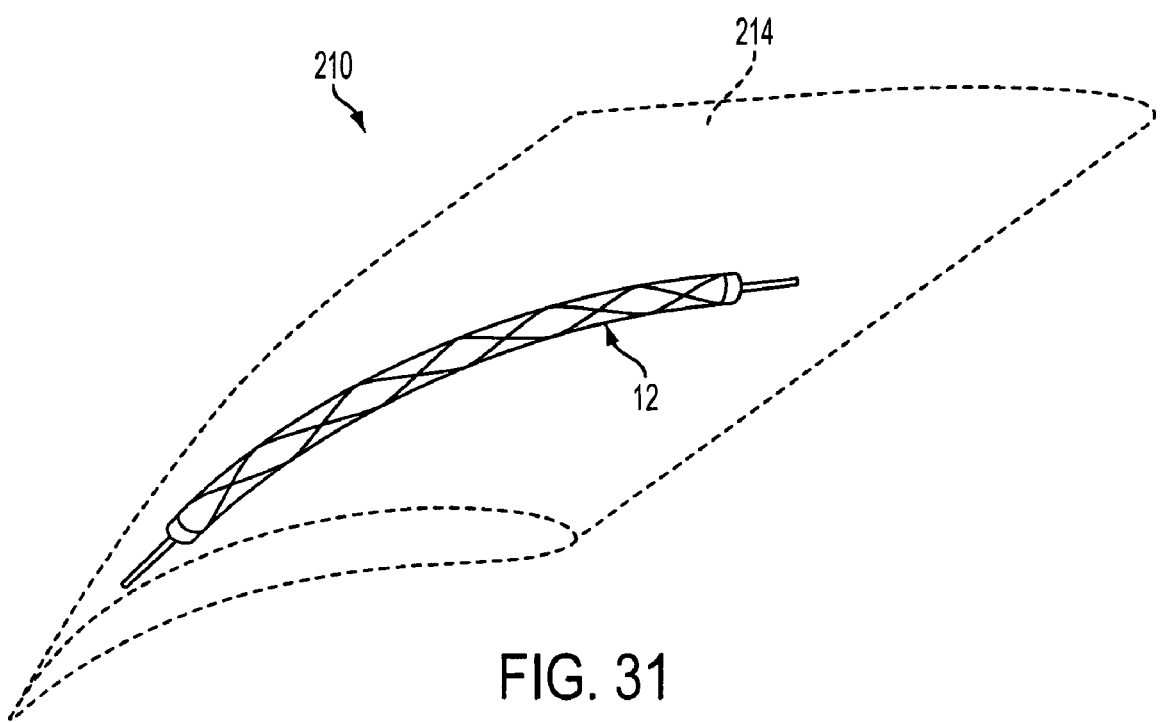
FIGS. 31-34 show embodiments of the FAM of FIG. 1 employed to twist or morph a fluidfoil.

Another morphing embodiment that uses FAM actuators 12 is shown as system 210 in FIG. 31. In order to negotiate the morphing motion, a supporting sub-structure 214, such a is needed that is flexible in the direction of shape change, yet rigid enough to resist aerodynamic or hydrodynamic forces in opposing directions. These include, but are not limited to, composite-coupled support structures, conformal honeycomb cores, beams or plates with tailored stiffness and cross-section profiles, and buckled members. The FAM actuators 12 have the ability to conform to these shapes, as seen in FIG. 31, while maintaining their pulling force. Thus, the FAMs 12 provide increased versatility. The configuration shown in FIG. 31 is for variable twist.

Figure 32:
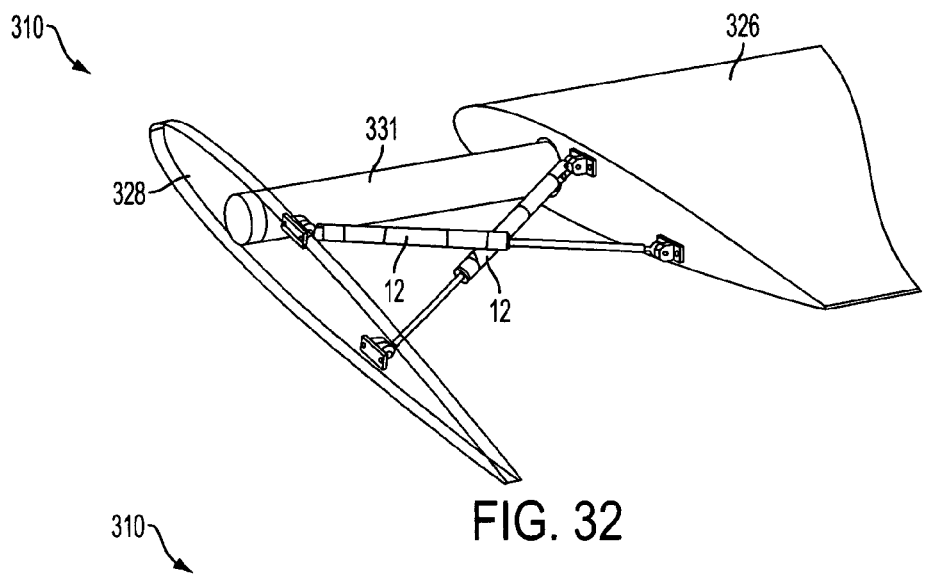
Figure 33:
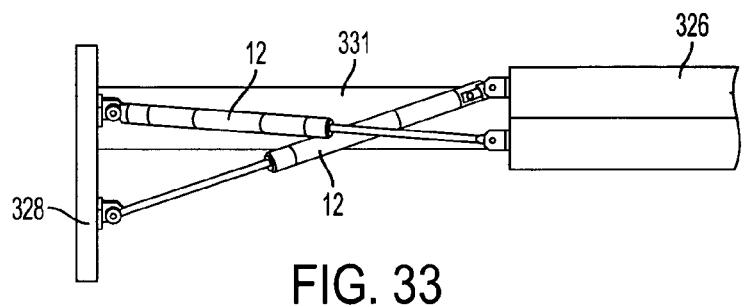
Figure 34:
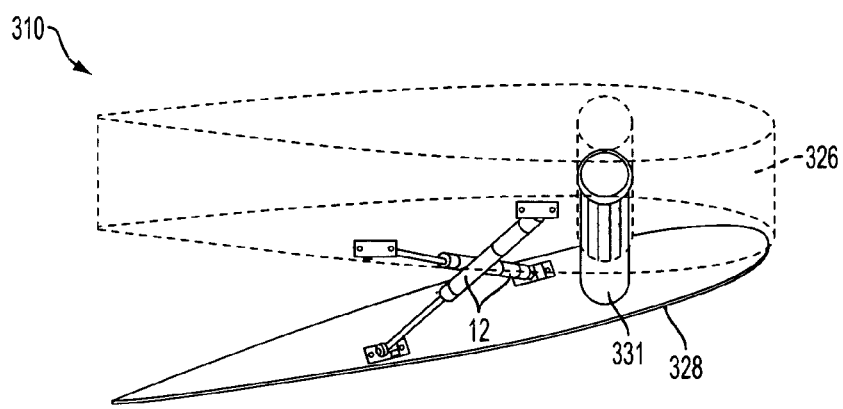

FIGS. 32-34 illustrate an additional twist-morphing embodiment. The illustrated system 310 is substantially similar to the embodiment of FIGS. 24 and 25 except that instead of the tip 328 extending purely in the spanwise direction, the tip 328 may move in the spanwise direction or in any number of other directions and/or configurations. The tip 328 may be attached to the wing 326 to permit the desired movement of the tip and the connecting materials, such as the flexible skin (not shown). For example, the tip 328 may be attached to the main portion of the wing 326 by a spar section 331 that may be, for example, resilient, hinged, pivotable, and/or telescoping with respect to the main portion of the wing 326. The FAMs 12 may then be selectively pressurized to extend, retract and/or twist the tip 328 section, as desired.

Of course, all of the embodiments and configurations disclosed herein may be augmented to reach additional performance objectives. For instance, several sets (multiples of one for uni-directional, multiples of two for bi-directional) of actuators 12 may be adopted for increased force generation. Alternatively, one pair (set) of actuators 12 may be incorporated for resisting aerodynamic forces at a desired set point and another pair (set) of actuators 12 may be included to operate around the set point for vibration control. Alternatively, two pairs (sets) of actuators 12 may be incorporated for inducing unsteady aerodynamic forces where both actuators operate in concert (in-phase) or opposite (at least somewhat out of phase) for bending actuation of a flexible wing. An analog description of this scheme is a system with coarse adjustment (deflected set point, low frequency) and fine adjustment (vibration reduction, high frequency).

The source of pressurized fluid 30 for the FAMs 12 may come from a variety of forms, including a compressed reservoir, a conventional pump (such as a gear pump, diaphragm pump, etc.), an electrohydrostatic actuator (smart pump, compact hybrid actuator), or a gas generator, to name a few. The system requirements, such as frequency response, flow rate, fluid type, etc., would of course lead to the selection of the most acceptable form for each intended application.

For operation of the system 10, the internal pressure of each FAM actuator 12 may be configured for switching between a desired operational pressure ($P_H$) and a lower pressure ($P_L$), which could be zero (exhausting to atmosphere) or a bias pressure. A three-way solenoid valve is one such device that can accomplish this task, by toggling the pressure in the FAM between $P_H$ and $P_L$ at the desired frequency profile.

The fluid used to pressurize the system 10 offers another design parameter. Fluid properties such as density, compressibility, and viscosity may all play a role in determining the overall efficiency and attainable power density. For example, a system 10 with air as the working fluid (PAM) has very little weight, but may suffer from compressibility. Conversely, a HAM actuation system may not suffer from compressibility effects like the PAM, but the associated fluid mass is much higher.

Figure 35:
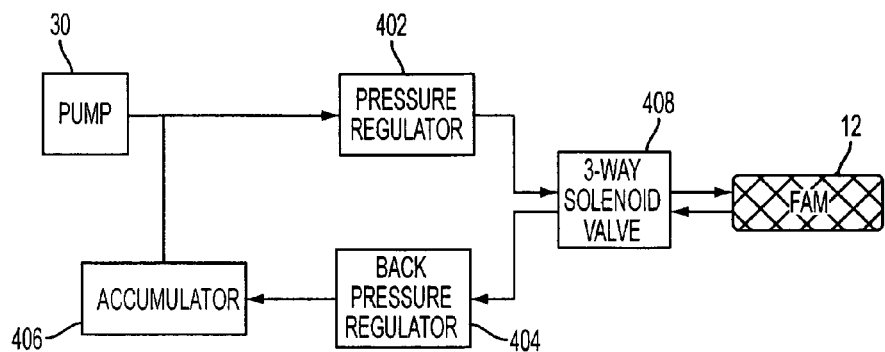
FIGS. 35-36 show schematic embodiments of control systems for the device of FIG. 1.

The systems of the invention, including system 10 may be configured for either manual control or automatic (electronic) control. For a manually controlled system, an operator would adjust the output of the pump 30, regulate pressures via a pressure regulator 402, a back pressure regulator 404 and an accumulator 406, and solenoid switching via solenoid 408 to achieve the desired control surface 14 actuation. One characteristic of manual control is the associated frequency limitation, which may prove infeasible for high frequency actuation, such as that required for vibration control. A general flow diagram of a manual control system is shown in FIG. 35.

Figure 36:
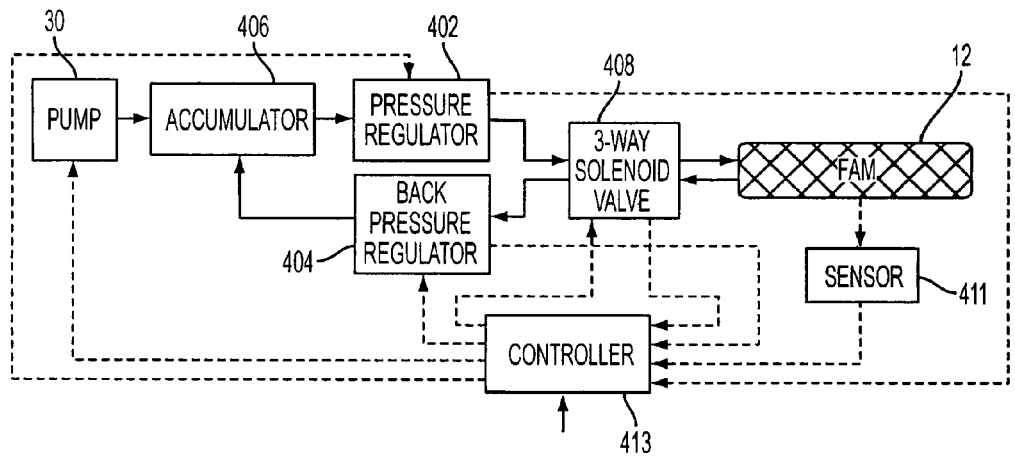

Automatic control can be used to provide improved frequency characteristics. By using sensor 411 measurements as feedback, a controller 413 may be designed to execute the command functions and update the performance requirements of the actuation system 10 in real-time. FIG. 36 shows a representative diagram of this system, where the short dashed lines denote measurement signals (controller inputs), the long dashed lines denote updated system signals (controller outputs), and the solid lines denote fluid flow. The bold arrow entering the controller 413 represents the desired action (such as the control surface deflection, vibration control, etc.) issued by the vehicle's current state or the operator's desired change in performance characteristics.

Two additional features that may be provided to the FAM actuation systems of the invention, such as system 10, include a lock-out mechanism and a ratcheting mechanism. The ratcheting mechanism could be employed to conserve power during periods requiring constant deflections to be held over relatively long periods of time. The lock-out mechanism would serve as a fail-safe device in the event that the vehicle would lose power and may also function similar to the ratcheting mechanism by locking the surface 14 into place to conserve power during periods requiring constant deflections to be held over relatively long periods of time.

Figure 37:
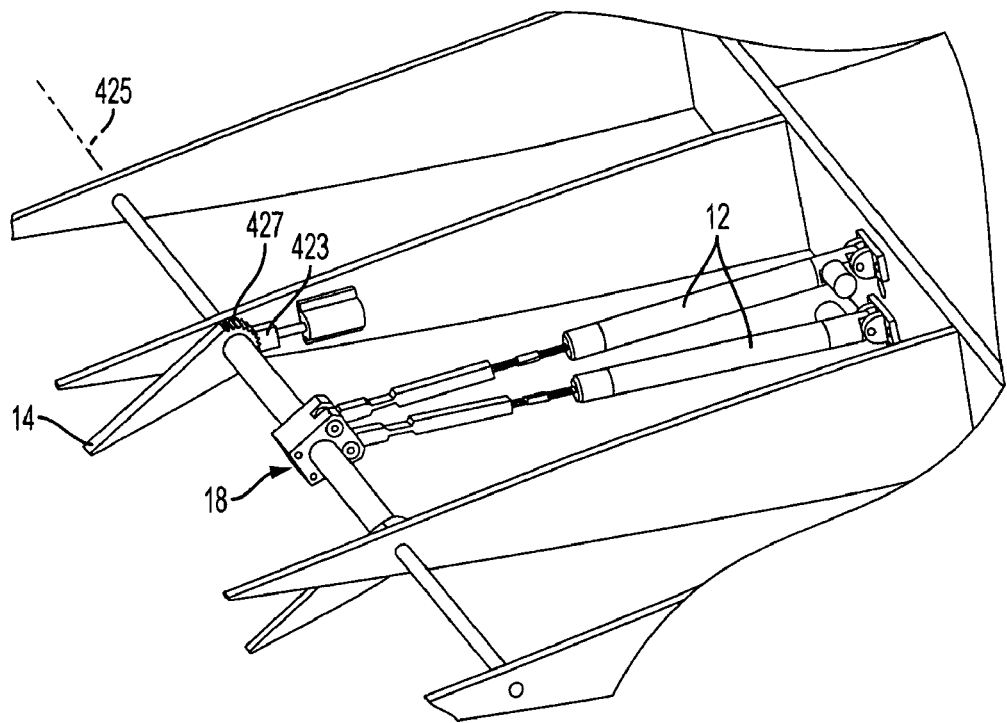
FIG. 37 shows a embodiment of the device of FIG. 1 with a locking mechanism.
Figure 38:
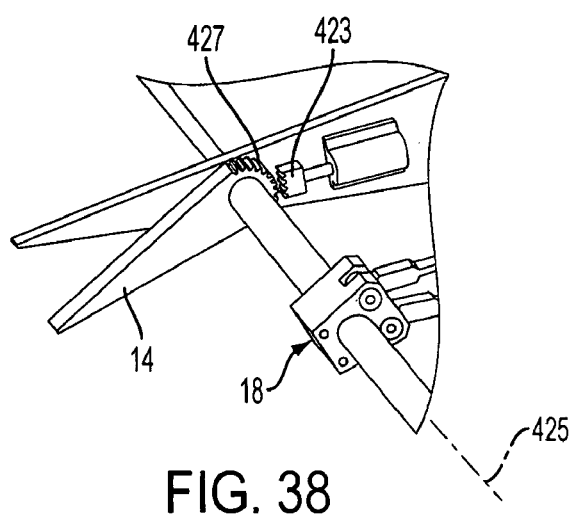
FIG. 38 shows an enlarged view of FIG. 37.

A lock-out mechanism may engage in emergency situations. In the event that vehicle 16 systems lose power for any reason, the lock-out mechanism may be activated to prohibit harmful control surface 14 deflections. To allow for possible loss of vehicle power, this system may be powered by an independent power source. Also, the lock-out mechanism may be configured as a dowel, off-center with the rotation axis of the control surface hinge that, when powered, retracts itself to allow the control surface to move freely, but when power is lost, it snaps back to engage with the hinge to prevent motion. A solenoid could accomplish this task, as well as a spring loaded mechanism. As illustrated in FIGS. 37 and 38, an alternative lock-out mechanism 421 may include the same driving mechanism described above but on a tooled fixture 423, such as a key, star bit, etc., or with teeth as illustrated. The fixture 423 is aligned with the hinge axis 425 that contains the female mate 427 to the tooled part 423. When a lock-out is needed, the fixture 423 will snap out of the normal position shown in FIG. 38 and move into the engaged, locked position shown in FIG. 37.

Figure 39:
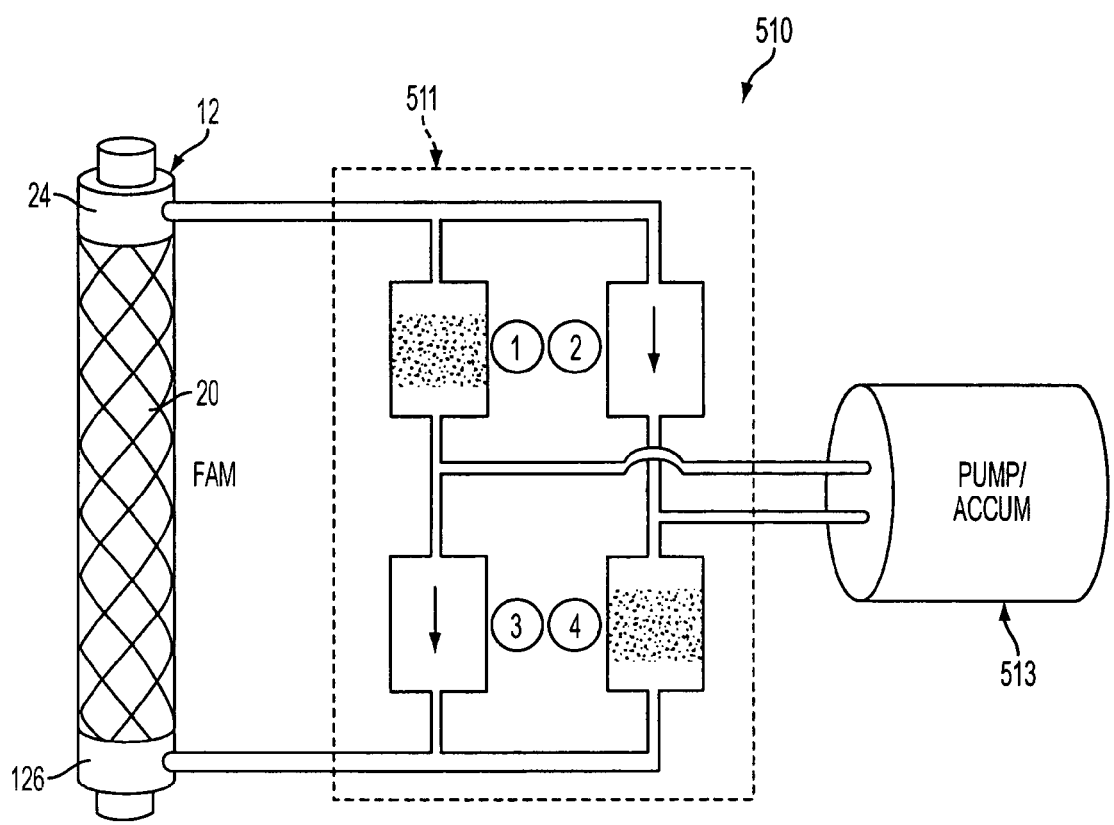
FIG. 39 shows an embodiment of a control concept for a FAM of FIG. 1 employed with magneto-rheological valves.

The ratcheting mechanism could use a similar driving element, but it would have a series of stops positioned according to the common deflection angles. The common mechanism found in ratchet wrenches could also be employed here. Additionally, various types of pressure control devices may be employed in the systems of the subject invention, such as in system 10. For example, FIG. 39 illustrates an embodiment of the invention in which the illustrated system 510 includes an arrangement wherein the flow of pressurized fluid to the FAMs 12 is accomplished through the use of a magneto-rheological valve network 511 coupled to a pump/accumulator system 513. Although, previous illustrated embodiments have shown only one fitting 24 permitting flow of fluid within a bladder 20, in the embodiment of FIG. 39 second end fitting 127 is substantially identical to end fitting 24. Thus, fluid may flow in through both fittings 24 and 127 and may flow in one direction through the bladder 20. It should be understood that the other embodiments of the inventions may also include end fittings wherein both end fittings permit the passage of fluid there through.

The foregoing embodiments have been provided to illustrate the structural and functional principles of the present invention, and are not intended to be limiting. To the contrary, the present invention is intended to encompass all modifications, alterations, and substitutions within the scope of the appended claims.

What is claimed is:

1. In a vehicle comprising any one of an airplane, helicopter and submarine characterized as having a fluidfoil, a dynamic actuation system for said vehicle, comprising:
   a contact surface attached to said fluidfoil and arranged to act against a fluid medium passing over said fluid foil and contact surface; and
   a first fluidic artificial muscle (FAM) actuator mounted in said fluidfoil and coupled along a first axis to said contact surface and adapted to pull said contact surface in a first direction when said first FAM selectively contracts in length along said first axis and radially expands as a function of increasing applied internal pressure, beginning with maximum length under no applied pressure and contracting with increasing pressure to a predetermined limit;

a second FAM actuator mounted in said fluidfoil and coupled along a second axis to said contact surface and adapted to pull said contact surface in a second direction when said second FAM selectively contracts in length along said second axis and radially expands as a function of increasing applied internal pressure, beginning with maximum length under no applied pressure and contracting with increasing pressure to a predetermined limit;

both of said first FAM actuator and said second FAM actuator each comprising, a resilient bladder having two opposing open ends, a braided reinforcing mesh surrounding said resilient bladder and having two opposing open ends in coordinated alignment with said opposing open ends of said resilient bladder, said braided reinforcing mesh having a braid angle defining said predetermined limit, a first end-fitting sealingly inserted into one open end of said resilient bladder and affixed within one open end of said braided reinforcing mesh, said first end-fitting having a port for receiving into or exhausting from said bladder a pressurized fluid, a second end-fitting sealingly inserted into the second open end of said resilient bladder and affixed within the second open end of said braided reinforcing mesh;

a transfer mechanism coupled between said first FAM actuator and said contact surface and antagonistically coupled between said second FAM actuator and said contact surface;

a first three-way valve for selectively controlling a flow of said pressurized fluid into and out from said first FAM actuator such that when an internal pressure within said first FAM is increased said first FAM is radially expanded and axially contracted, and when an internal pressure within said first FAM is decreased said first FAM is radially contracted and axially expanded;

a second three-way valve for selectively controlling a flow of said pressurized fluid into and out from said second FAM such that when an internal pressure within said second FAM is increased said second FAM is radially expanded and axially contracted, and when an internal pressure within said second FAM is decreased said second FAM is radially contracted and axially expanded;

said first three-way valve toggling simultaneously and opposite to said second three-way valve to cause dynamic bidirectional deflection of said fluid contact surface to any angle between a first position and a second position at a desired frequency profile, by alternately reducing internal pressure in said first FAM bladder while increasing internal pressure in said second FAM bladder from a lower pressure $P_L$ to a desired operational pressure $P_H$ thereby pulling said fluid contact surface in said second direction, and by increasing internal pressure in said first FAM bladder from a lower pressure $P_L$ to a desired operational pressure $P_H$ while reducing internal pressure in said second FAM bladder to pull said fluid contact surface in said first direction.

2. A system according to claim 1, further comprising:
a lock coupled to said contact surface to maintain said contact surface in a fixed position.

3. The system according to claim 1, wherein said second end-fitting has a port for receiving into or exhausting fluid from said resilient bladder.

4. The system according to claim 1, wherein said first FAM actuator resilient bladder comprises a resilient membrane and said braided reinforcing mesh is embedded within said resilient membrane.

5. The system according to claim 1 wherein said first and second valves are each a three-way solenoid valve for selectively and individually pressurizing, exhausting or isolating said first and second FAM actuator resilient bladders.

6. A system according to claim 1, wherein said transfer mechanism further comprises:
a first linkage connected between said contact surface and said first FAM actuator, said first linkage adapted to cause, in response to said axial contraction of said first FAM actuator, said contact surface to move in a first direction to any point along a continuum between a first position and a second position to enable control of the vehicle; and
a second linkage connected to said contact surface and said second FAM actuator and antagonistically disposed to oppose the motion of the contact surface in said first direction and adapted to cause said contact surface to move in a second direction opposite of said first direction in response to axial contraction of said second FAM actuator.

7. A system according to claim 1, wherein said contact surface is a flap foil.

8. The system according to claim 7, wherein said first FAM actuator resilient bladder comprises a resilient membrane and said braided reinforcing mesh is embedded within said resilient membrane.

9. A system according to claim 1, wherein said contact surface is supported by a frame internal to said fluidfoil and said first FAM actuator is coupled to said frame.

10. A system according to claim 9, wherein said frame includes multiple elements pivotally coupled together to move relative to each other.

11. A system according to claim 9, wherein said contact surface is a flexible skin.

12. A system according to claim 11, wherein said contact surface is a composite material.

13. A system according to claim 11, wherein said actuation system changes the shape of said frame and of the contact surface.

14. The system according to claim 1 wherein
said first FAM actuator resilient bladder is constructed of a resilient membrane,
said first FAM actuator first end-fitting and said second end-fitting are each comprised of a recessed portion for insertion into said resilient membrane and an outer surface,
said recessed portion having a diameter of the less than a diameter of the respective outer surfaces by twice a combined thickness of said resilient membrane and the braided reinforcing mesh such that an outside surface of the braided reinforcing mesh is flush with an outer surface of said outer surfaces when said end-fittings are inserted into said opposing open ends, and the diameter of the recessed portions are substantially equivalent to an internal diameter of said resilient membrane, and
a band is clamped over said braided reinforcing mesh and said resilient membrane said thereby maintaining said resilient membrane in sealed contact with said recessed portion.

15. The system according to claim 14 wherein said band is a wire winding or press-fit sleeve.

16. The system according to claim 14 wherein said recessed portion is textured on an external surface for cooperative engagement with said resilient membrane, said texture selected from the group selected from the group consisting of threading, annular grooving, dimpling, knurling, crosshatching, and roughening.

* * * * *